US008875304B2

(12) United States Patent
Celi, Jr. et al.

(10) Patent No.: US 8,875,304 B2
(45) Date of Patent: Oct. 28, 2014

(54) APPLICATION AND DATA REMOVAL SYSTEM

(71) Applicant: International Business Machines Corporation, Armonk, NY (US)

(72) Inventors: Joseph Celi, Jr., Boca Raton, FL (US); Mark McGloin, Killiney (IE); Olgierd Stanislaw Pieczul, Killiney (IE)

(73) Assignee: International Business Machines Corporation, Armonk, NY (US)

(*) Notice: Subject to any disclaimer, the term of this patent is extended or adjusted under 35 U.S.C. 154(b) by 131 days.

(21) Appl. No.: 13/671,610

(22) Filed: Nov. 8, 2012

(65) Prior Publication Data

US 2014/0130174 A1    May 8, 2014

(51) Int. Cl.
 *G06F 7/04* (2006.01)
 *G06F 21/60* (2013.01)
 *H04L 12/40* (2006.01)
(52) U.S. Cl.
 CPC ........... *G06F 21/60* (2013.01); *H04L 12/40104* (2013.01)
 USPC .......................................................... 726/26

(58) Field of Classification Search
 CPC .................... H04L 12/2461; H04L 12/40104; G06F 21/00; G06F 12/14
 USPC .......................................................... 726/26
 See application file for complete search history.

(56) References Cited

U.S. PATENT DOCUMENTS

| | | | |
|---|---|---|---|
| 5,444,764 A * | 8/1995 | Galecki | 455/411 |
| 5,864,757 A * | 1/1999 | Parker | 455/418 |
| 6,314,283 B1 | 11/2001 | Fielden | |
| 7,986,939 B2 | 7/2011 | Brown | |
| 8,660,530 B2 * | 2/2014 | Sharp et al. | 455/411 |
| 8,719,909 B2 * | 5/2014 | Fitzgerald et al. | 726/7 |
| 2008/0172744 A1 | 7/2008 | Schmidt et al. | |
| 2010/0279673 A1 | 11/2010 | Sharp et al. | |

* cited by examiner

*Primary Examiner* — Krisna Lim
(74) *Attorney, Agent, or Firm* — David A. Mims, Jr.; Damion Jospehs; Robert V. Wilder

(57) ABSTRACT

A method, programmed medium and system are provided for a server-based security manager application to support a self-cleaning operation on a remote computerized device. When a computer device has been reported as being missing for example, the security manager server application will cause the device to take pro-determined actions such as un-installing predetermined applications contained on the device and removing all persisted data associated with such predetermined applications.

20 Claims, 3 Drawing Sheets

APPLICATION AND DATA REMOVAL SYSTEM

FIELD OF THE INVENTION

The present invention relates generally to information processing systems and more particularly to a methodology and implementation for enabling selective removal of data and application from electronic devices.

BACKGROUND OF THE INVENTION

Many device and computer system applications persist data on a device using various applications. Such devices include, but are not limited to, computerized desktop and device systems, including laptops, pads, cell phones or any device that has network capability and can run software. As used herein, the term "device" refers to any electronic system capable of storing data, and/or applications and accessing private or public networks such as the Internet.

Stored data on such devices may or may not contain sensitive or confidential information and may or may not be encrypted. When a device is lost or stolen this data should be wiped from the device. Remote device wiping of application and corresponding or associated data is typically something that is handled by a Device Manager (MDM) client running on the device. Some applications also have the ability to remotely take action when the device is lost and stolen. Clients typically must be always running or connected in order to accomplish this remote administration. Many device users do not like the requirement to have an MDM client constantly running on the device. These connected type application can take up precious resources, including memory and CPU cycles.

It should also be noted that devices running on some operating systems are also limited to the number of "slots" at any given time. For example, in one operating system, there is a slot maximum of 32. Each running process takes up one of these slots and each DLL in memory also takes up a slot. Once the 32 slots are filled the OS will start killing application causing the device to have unpredictable behavior.

Thus, there is a need to provide a device and processing system which is enabled to provide self-cleaning when the device is reported missing by a user.

SUMMARY OF THE INVENTION

A method, programmed medium and system are provided for a security manager application running on a server to support a self-cleaning operation of a remote device. When a computer device has been reported as being lost or stolen or simply missing, the security manager server application will take appropriate predetermined actions which may include, for example, un-installing predetermined applications contained on the remote computer device and removing all persisted data associated with such predetermined applications.

In one exemplary embodiment, a new call to the device's application security manager server is made at system initialization time and the device user is prompted to provide the device user or owner's name, device owner's company name, device ID, the OS information, etc. The first call to the device's application security manager program running on the application security manager server requires the device application to gather and store the device information in a device information file, device registry or any other persistent storage means that is enabled for that particular device. Subsequent calls by this device application or any other device application on the device will have access to this information and will not have to obtain it. Obtaining this device information is required only once per device regardless of how many applications on that device are utilizing this system. The application/security manager server, will respond to a call from the device and if the device had previously been reported as lost, stolen, or missing, the server will send code to the device and the device will respond by taking predetermined actions such as to clean the device of all persisted data and uninstall itself.

Such actions can include a removal of predetermined applications and associated data from the device which can be accomplished by the device itself by, for example, making an API call to the operating system running the device without requiring any separate security monitoring software or application to foe running on the device. Other actions may include a soft or hard reset or a complete wipe of the device and a recording of the time and GPS location of the device when the device was cleaned.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
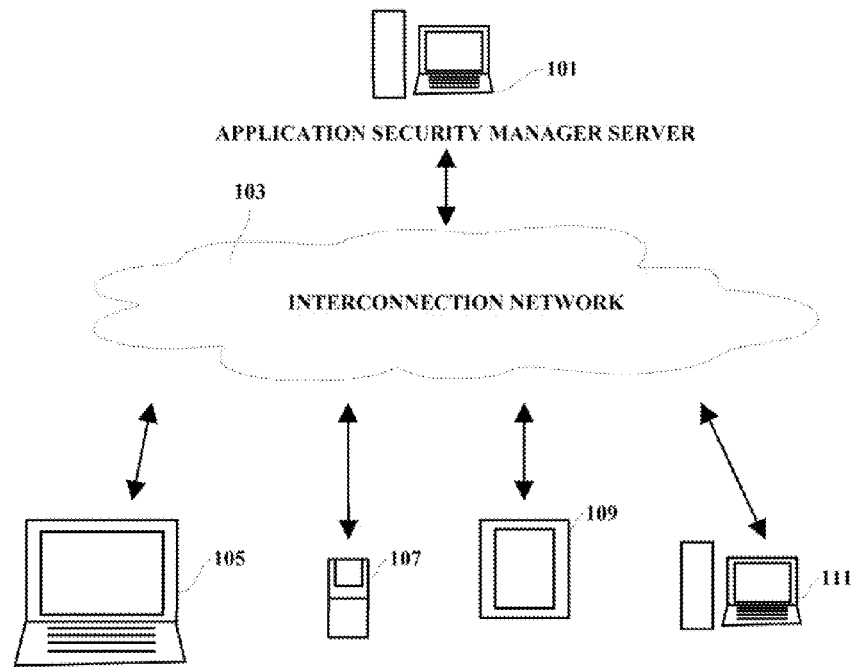
FIG. 1 is an illustration of one embodiment of a system in which the present invention may be implemented.

The various methods discussed herein may be implemented within a computer system which includes processing means, memory, storage means, input means and display means. Since the individual components of a computer system which may be used to implement the functions used in practicing the present invention are generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention. Although the invention is illustrated in the context of a networked computer system using a laptop computer or other portable device, it is understood that disclosed methodology may also be applied in many other available and future devices and systems such as desktop computer systems, cell phones and personal wireless and other hand-held devices. Such devices may include any of many available input systems, including touch-sensitive screens or touch-sensitive input pads, to achieve the beneficial functional features described herein.

Device applications can utilize the disclosed system by simply adding a new call to an application/security manager program running on a security manager server at program initialization time. The device will provide, inter alia, the device owner's name, device owners, company name, device ID, and the OS information. The first call to the application/security manager will require the device application to gather this information, however, subsequent calls by this device application or any other device application on the device will have access to this information and will not require additional information input, in other words, obtaining this information should only happen once per device regardless of how many applications on that device are utilizing this system.

Mostly all of the support for the remote cleaning feature is packaged in a way that it can be easily shared by all of the device applications on the device. After the server has received and logged in a request to remove wipe or erase the device for any reason, for example if the device has been reported as simply misplaced by the owner or is missing, lost or stolen, the application/security manager, will not respond to any subsequent call from the device. The server security application will then send instructions to the device and the device application can take the necessary action at that point which will typically be to clean the device of all persisted data and uninstall predetermined applications. Other actions can of course be done such as a complete device wipe. When the device application makes a call to some shared logic, which could be installed at a call center, the various device wipe actions are performed in response to a receipt of the call after a device had been reported missing. The call center is also enabled to update the application/security manager and related information files accordingly.

In operation, when an application on a device runs for the first time on a device, and it is determined that this is the first time the application has been run on the device, the application calls the security manager server with an initialization/registration request. The application can detect the first run on a device by, for example, checking the system registry to see if application keys are stored for this feature. The device user then provides requested application/device information and the server acknowledges the device/application pair and returns a token. The information about this application/device pair is stored on server and the token from application manager server is stored by device in the device registry and the application selected by the device user proceeds to run as normal on the device.

When a device owner calls a Help desk to request a device wipe, for example if the device has been lost or stolen, the Help desk informs application manager team about the request and application manager on the application manager server is updated accordingly. If, anyone attempts to run an application, for example if someone tries to open an email account using the device after a request has been received by the server to wipe the device, the application manager server detects that the calling device had previously been marked as missing and sends a command down to device application to send up certain information then issue a wipe device command. The application on device then calls the security application manager feature on device to wipe the device and the device is wiped clean in accordance with predetermined instructions which could include wiping predetermined applications and/or data associated with predetermined applications on the device. The application manager software on server, in one example, records time and location of this event and sends a report to the registered device owner/user by a predetermined channel such as via an email notification which can be independently accessed by the user/owner.

The disclosed system has the security server issuing the wipe command to the client device. The disclosed system does not, however, require any special software to be run on the device. Thus, any device application that can be run on the device can choose to participate in the disclosed security system without the need to have any special device manager software included in the application.

FIG. 1 illustrates an exemplary environment in which the present invention may be implemented. As shown, an application security manager 101 which includes an application security manager program, is accessible through an interconnection network 103, for example the Internet, from any of a plurality of devices including, inter alia, a laptop computer device 105, a device 107 such as a cell phone, a tablet or pad device 109 and a desktop computer device 111. The disclosed system is enabled to use the application security manager server 101 to selectively wipe or erase predetermined applications and/or data associated, with such applications from any device 105-111 when such action is requested by a user/owner of the device if, for example, the device is missing or has been lost or stolen.

Figure 2:
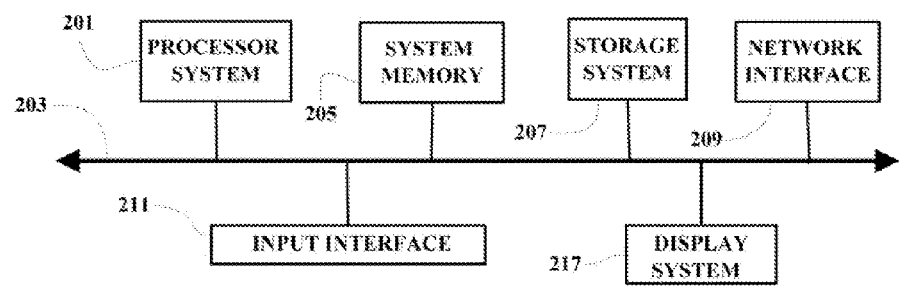
FIG. 2 is a block diagram showing several of the major components of an exemplary computer system or device using the present invention.

FIG. 2 illustrates i general several of the major components of a computer system which may be used to implement the present invention. As shown, a processor system 201 is connected to a main bus 203. The main bus 203 is also coupled to, inter alia, system memory 205, a local storage system 207, a network interface 209, and an input interface 211. The main bus is also connected to a display system 217. The input and/or display system may also comprise a touch-sensitive screen or optically-sensitive input pad (not shown). Additional systems such as a GPS system on the device, which are not shown, may also foe coupled to the system main bus 203. The basic components shown in FIG. 2 may be implemented in the server 101 as well as any of the other devices 105-111 illustrated in FIG. 1.

Figure 3:
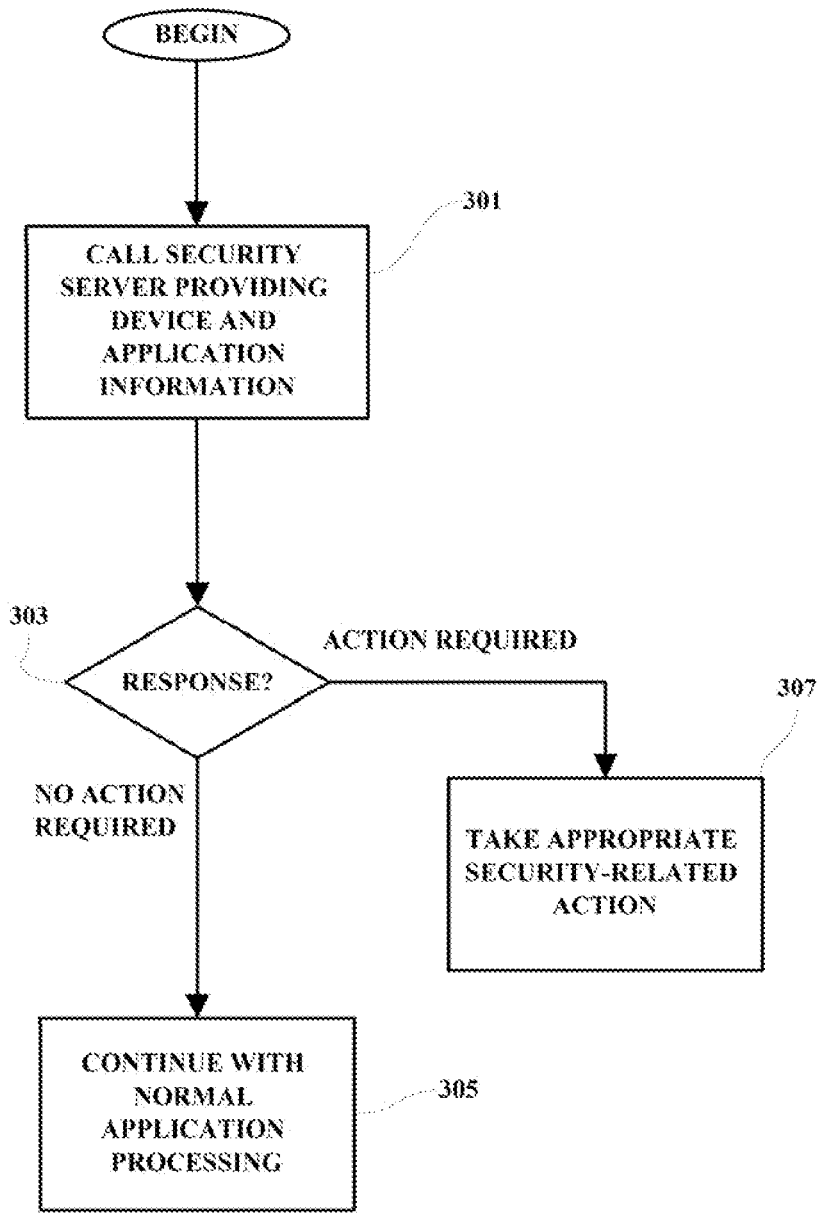
FIG. 3 is a flow chart illustrating an exemplary sequence of operations which may be implemented in a system in accordance with the present invention.

A flow chart describing an exemplary operational sequence which may be implemented in a device to accomplish the results described above is shown in FIG. 3. As shown, when the process is initiated and a new application is opened on a device, the security server 101 is called and the device provides information 301 to the server which may include device-specific information and device applications information present on the device.

The device security information may be provided automatically by the device if a file has been previously established, on the device. After receiving the device security information, the server checks its records to determine if the device has been reported as missing, lost or stolen, and then sends a response 303 back to the device. If the device had previously been reported as missing, the server will send a response 303 back to the device indicating that device-cleaning action is required, and the device will take appropriate predetermined actions 307 such as sending current time and GPS location information (possibly including other predetermined application data back to the server, before wiping or removing predetermined applications and data, or wiping the entire device or performing a hard or soft reset of the device. If the server 101 determined that the device had not been previously reported as missing, lost or stolen, then the response from the server back to the device would indicate that no security action is required and the device would continue 305 to run the device application selected by the user in a normal fashion.

In the example, when the server receives the requested application/device information from the device, a token is returned to the device and after the token is received by the device, it is stored in the device and the device continues by running the opened application in a normal manner. The token use is optional and is used as a security token to prove that the security server is authentic.

Figure 4:
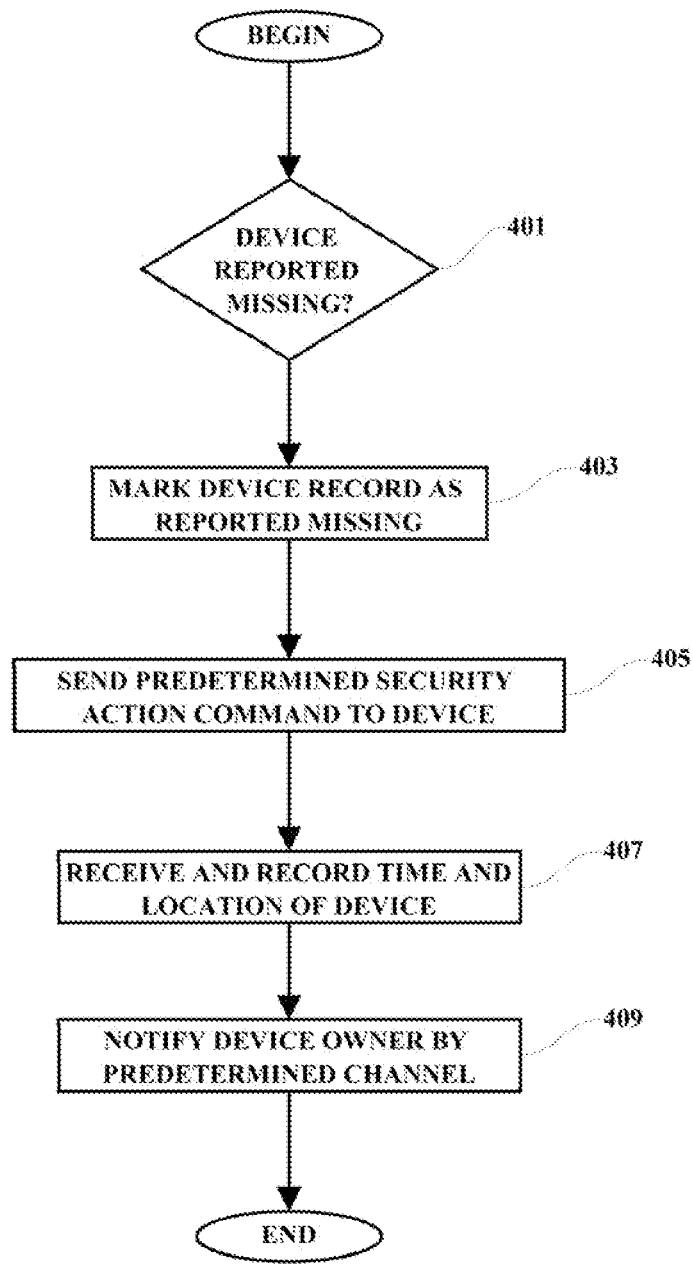
FIG. 4 is a flow chart illustrating an exemplary sequence of operations which may be implemented in a security manager server in accordance with the present invention.

A flow chart describing an exemplary operational sequence which may be implemented in a security manager server to accomplish the application/data removal operation discussed above is shown in FIG. 4. As shown, when a device is reported as missing 401, the server records the fact that the device has been reported missing 403 and when a device application is subsequently opened, the security server sends instructions to the device to perform a predetermined security action 405. Upon receiving the security action code from the server 101, the device will, for example, determine the current time and location of the device and send this information to the security server to be recorded 407 at the server before the device itself performs the predetermined security actions in the device. The device owner may then be notified 409 by separate predetermined channels 409, such as by separate email or message account, that the predetermined security actions have been performed by the device and the last known location of the device.

The device may also be only selectively cleaned to remove only predetermined ones of the device applications so that, for example, the GPS function of the device may, as predetermined by the user, continue to operate and send location information back to the security server after the device has been only selectively cleaned of sensitive applications and/or data.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is understood that the specific example presented herein is not intended to be limiting since the functional combinations disclosed herein may be implemented in many different environments and application including, for example, application involving the visualization of business processes and movement of emails, task lists, task list items and other system data components within an overall system data containment environment or application.

The method, system and application of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored in any storage device, including any portable or fixed, volatile or non-volatile memory device, including CDs, RAM and "Flash" memory, or other semiconductor, optical, magnetic or other memory capable of storing code, from which it may be loaded into other memory units and executed to achieve the beneficial results as described herein. The disclosed methodology may also be implemented using any available input and/or display systems including touch-sensitive screens and optically-sensitive input pads. Accordingly, the present invention is not intended to foe limited to the specific form set forth herein, but on the contrary, it is intended to cover such alternatives, modifications, and equivalents, as can be reasonably included within the spirit and scope of the invention.

What is claimed is:

1. A machine and/or software implemented method for processing security management of a remote electronic device to support a self-cleaning operation of said remote electronic device, said remote electronic device including a network interfacing unit arranged for connecting to other electronic devices through an interconnection network, said remote electronic device having at least one software application stored therein, said method comprising:
    receiving device related information by a security server from said remote electronic device, said device related information including information identifying said remote electronic device;
    storing said device related information by said security server;
    receiving by said security server of notification to remove at least said one ware application stored on said remote electronic device; and
    said security server causing a self-cleaning operation to occur on said remote electronic device for removing at least said one software application stored on said remote electronic device from said remote electronic device after receiving said notification.

2. The method as set forth in claim 1 wherein said notification is provided to said security server independently of said remote electronic device, said security server being operable for supporting said self-cleaning operation of said remote electronic device.

3. The method as set forth in claim 1 and further including:
    receiving by said security server of user identification information along with said device related information; and
    storing said user identification information in association with said device related information in a device information file containing said device related information and said user identification information.

4. The method as set forth in claim 1 wherein said device information file is accessible to support a self-cleaning operation for any application installed on said remote electronic device.

5. The method as set forth in claim 1 and further including said security server receiving listing of applications to be removed from said remote electronic device after receiving said notification.

6. The method as set forth in claim 5 wherein said device related information further includes said listing of applications to be removed from said electronic device after receiving said notification.

7. The method as set forth in claim 1 and further including running a security management application by said security server, said security management application being operable for enabling a communication with said remote electronic device over said interconnection network.

8. The method as set forth in claim 7 wherein said self-cleaning operation is initiated in response to detecting an attempt to run an application on said remote electronic device after said notification.

9. The method as set forth in claim 1 wherein said remote electronic device is a desktop or laptop computer system.

10. The method as set forth in claim 1 wherein said remote electronic device is a hand-held electronic device.

11. The method as set forth in claim 1 wherein said remote electronic device is a tablet computer device.

12. A computer program product comprising a computer-readable, tangible storage devices) and computer-readable program instructions stored on the computer-readable, tangible storage device(s) for processing security management of a remote electronic device to support a self-cleaning operation of said remote electronic device, said remote electronic device having device applications stored therein, the computer-readable program instructions, when executed by a processing system, being operable for implementing a method comprising:
    receiving device related information by a security server from said remote electronic device, said device related information including information identifying said remote electronic device;
    storing an information file by said security server, said information file containing said device related information;
    receiving by said security server of notification to have one or more of said stored device applications and/or data associated with said stored device applications removed from said remote electronic device; and
    causing a self-cleaning operation to occur on said remote electronic device for removing at least one of said stored device applications and/or data associated with at least one of said stored device applications from said remote electronic device after receiving said notification.

13. The method as set forth in claim 12 wherein said notification is provided to a said security server independently of said remote electronic device, said security server being operable for supporting said self-cleaning operation of said remote electronic device.

14. The method as set forth in claim 12 and further including:
    receiving by said security server of user identification information along with said device related information; and
    storing said user identification information in association with said device related information in a device information file containing said device related information and said user identification information.

15. The method as set forth in claim 12 wherein said device information file is accessible to support a self-cleaning operation for any application installed on said remote electronic device.

16. The method as set forth in claim 12 and further including said security server receiving a listing of applications to be removed from said remote electronic device a lying said notification.

17. The method as set forth in claim 16 wherein said listing of applications is included in said device related information.

18. The method as set forth in claim 12 and further including running a security management application by said security server, said security management application being operable for enabling a communication with said remote electronic device over said interconnection network, said self-cleaning operation being initiated in response to detecting an attempt to run an application on said remote electronic device after said notification.

19. The method as set forth in claim 12 wherein said remote electronic device is a computerized electronic device capable of storing software applications and data associated with said software applications.

20. A processing system for processing security management of a remote electronic device to support a self-cleaning operation of said remote electronic device, said remote electronic device including a network interfacing unit arranged for connecting to other electronic devices through an interconnection network, said remote electronic device having at least one software application stored therein, said system comprising:
    a server system operable for receiving device related information from said remote device, said device related information including information identifying said remote electronic device;
    a storage device for storing device related information;
    a receiving system for receiving notification to remove at least said one software application stored on said remote electronic device, said notification being received by said server system independently from said remote electronic device, said server system being operable after receiving said notification for causing a self-cleaning operation to occur on said remote electronic device for removing at least one of said device applications and/or data associated with at least one of said device applications from said remote electronic device after receiving said notification, said server system being operable for initializing said self-cleaning operation on said remote electronic device in response to detecting an attempt to run an application on said remote electronic device after said server system has received said notification.

\* \* \* \* \*